United States Patent [19]

Wada et al.

[11] Patent Number: 4,608,293
[45] Date of Patent: Aug. 26, 1986

[54] COMPOSITE SUBSTRATE FOR A THIN-FILM MAGNETIC HEAD

[75] Inventors: Toshiaki Wada; Yoshiaki Katsuyama, both of Osaka, Japan

[73] Assignee: Sumitomo Special Metal Co., Ltd., Osaka, Japan

[21] Appl. No.: 471,491

[22] Filed: Mar. 2, 1983

[30] Foreign Application Priority Data

Jul. 27, 1982 [JP] Japan ................. 57-131834

[51] Int. Cl.$^4$ ............................. G11B 7/12
[52] U.S. Cl. .................. 428/141; 204/192 M; 360/110; 360/120; 360/122; 360/125; 360/126; 360/127; 427/128; 427/129; 427/131; 427/132; 427/355; 428/426; 428/446; 428/450; 428/694; 428/699; 428/701; 428/900; 428/472
[58] Field of Search .............. 360/120, 127, 126, 122, 360/125, 110; 428/472, 446, 64, 65, 694, 693, 900, 141, 450, 426, 699, 701; 427/131, 130, 128, 132, 129, 355; 204/192 M

[56] References Cited

U.S. PATENT DOCUMENTS

| | | | |
|---|---|---|---|
| 3,470,020 | 9/1969 | Boudreaux | 427/129 |
| 3,681,225 | 8/1972 | Genma | 427/129 |
| 3,683,126 | 8/1972 | Krause | 360/126 |
| 4,170,788 | 10/1979 | Hashimoto | 360/120 |
| 4,246,620 | 1/1981 | Kaminaka | 360/127 |
| 4,254,189 | 3/1981 | Fisher | 427/129 |
| 4,411,960 | 10/1983 | Mizuhara | 428/472 |
| 4,422,117 | 12/1983 | Nomura | 360/127 |

FOREIGN PATENT DOCUMENTS

| | | | |
|---|---|---|---|
| 51-68207 | 12/1976 | Japan | 427/129 |
| 4762 | 1/1980 | Japan | 360/126 |

Primary Examiner—Ellis P. Robinson
Attorney, Agent, or Firm—Watson, Cole, Grindle & Watson

[57] ABSTRACT

A composite substrate for a thin-film magnetic head comprises a substrate material, and an insulating oxide film formed thereon, and defining a smooth and stress-free surface having a surface roughness not greater than 50 Å. A film of a magnetic material having improved magnetic properties may be formed on the surface of the oxide film.

5 Claims, 2 Drawing Figures

F I G. 1
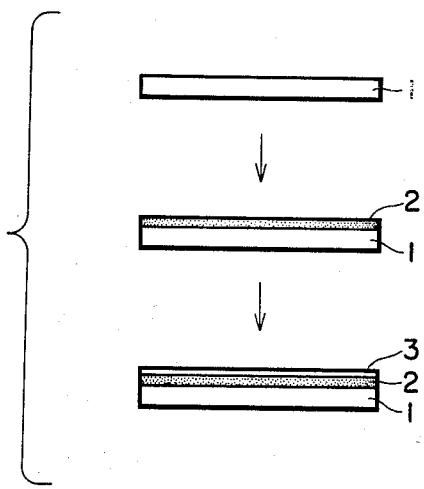
F I G. 2
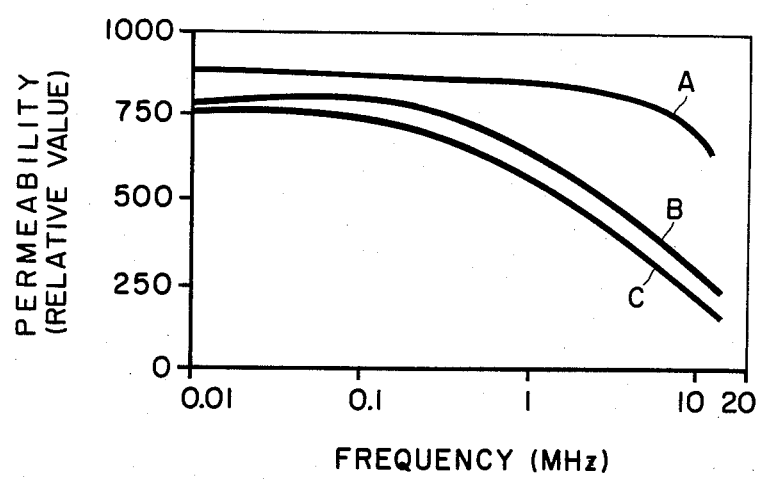

COMPOSITE SUBSTRATE FOR A THIN-FILM MAGNETIC HEAD

BACKGROUND OF THE INVENTION

1. Field of the Invention

This invention relates to a composite substrate for a thin-film magnetic head.

2. Description of the Prior Art

An improvement in recording density and wear resistance is strongly required for a magnetic head for use in a computer, or an audio, VTR or like apparatus. A thin-film magnetic head manufactured by using IC technology is considered to best satisfy those requirements.

A thin-film magnetic head includes a substrate which is made of a soft magnetic material such as Mn-Zn or Ni-Zn ferrite or Sendust, or a non-magnetic material of high wear resistance and precision workability, for example, a ceramic material such as $Al_2O_3$-TiC, $Al_2O_3$-$TiO_2$ or $Al_2O_3$-$Fe_2O_3$. An electrically conductive substrate is necessary to be formed an insulating film on the substrate, which is non-conductive and high in mechanical strength and hardness is formed on a carefully polished substrate surface from an oxide such as $Al_2O_3$ or $SiO_2$ to ensure electrical insulation from two layers of a soft magnetic material, such as permalloy or Sendust are formed on the substrate and a copper, aluminum or like conductor The insulating oxide film is formed by thin-film forming techniques, such as vacuum deposition, CVD (chemical vapor deposition) or sputtering, and has a thickness of, say, several to 50 microns. This film, however, has a rough surface, depending on the surface roughness of the substrate and the conditions under which the film has been formed. If a film of a magnetic material is formed directly on the rough surface of the insulating film, it becomes extremely inferior in film magnetic properties to a bulk material, such as a sputtering target, in a highfrequency range. The rough surface of the insulating film is, therefore, polished mechanically by, for example, a diamond powder. The surface is, however, still unsatisfactory in smoothness, and moreover, the stress created by the polishing operation remains therein. Accordingly, the film of a magnetic material formed thereon remains unsatisfactory in magnetic properties.

SUMMARY OF THE INVENTION

It is an object of this invention to eliminate the drawbacks of the prior art as hereinabove pointed out, and provide an improved composite substrate for a thin-film magnetic head including a smooth and stress-free insulating oxide film having a surface roughness not greater than 50 Å.

It is another object of this invention to provide a composite substrate for a thin-film magnetic head further including a film of a magnetic material formed on the smooth and stress-free surface of the insulating oxide film, and therefore having improved magnetic properties.

According to this invention, an insulating film of an oxide, such as $Al_2O_3$ or $SiO_2$, is formed on a substrate of a soft magnetic material or a non-magnetic material, and its surface is polished under pressure by a rotating polisher in a suspension in pure water of MgO, $SiO_2$ or $Al_2O_3$ powder or a mixture thereof having a particle diameter not exceeding 0.1 micron. The oxide film surface is, thus, stress-free, and has a surface roughness not greater than 50 Å. The film of a magnetic material is formed on the oxide film by, for example, evaporation, plating or sputtering.

BRIEF DESCRIPTION OF THE DRAWINGS

FIG. 1 is series of views illustrating the manufacture of a composite substrate embodying this invention; and FIG. 2 is a graph comparing the composite substrate of this invention and other composite substrates with respect to the relationship between the frequency and the relative value of permeability.

DETAILED DESCRIPTION OF THE INVENTION

Referring to FIG. 1, a composite substrate embodying this invention comprises a substrate 1 formed from a soft magnetic material or a non-magnetic material, and carrying thereon an insulating oxide film 2 formed by evaporation, sputtering or otherwise from an oxide such as $Al_2O_3$ or $SiO_2$. The oxide film 2 has a smooth and stress-free surface having a surface roughness not greater than 50 Å (=5 mn). The smooth film surface is obtained by polishing in a suspension in pure water of MgO $SiO_2$ or $Al_2O_3$ powder, or a mixture thereof having a particle diameter not exceeding 0.1 micron. The substrate is placed in a container holding the suspension and provided with a rotatable disk-shaped polisher having a polishing surface formed from hard cloth, Sn or like material. The oxide film surface is brought into contact with the rotating polisher surface under a predetermined amount of pressure.

The material of the polisher, its rotating speed and the pressure applied to the film surface depend on the particle diameter of the powder, its quantity in the suspension and the material from which the oxide film is formed. The use of a powder or powder mixture having a particle diameter exceeding 0.1 micron brings about a reduction in polishing, power, and therefore, a longer polishing time.

If the suspension contains less than 0.5% by weight of such powder, it fails to provide a satisfactory polishing result. On the other hand, the use of a suspension containing more than 20% by weight of such powder results in a lower polishing efficiency due to the generation of heat of hydration, gellation and an increase in viscosity. Therefore, it is advisable to use a suspension containing 0.5 to 20% by weight of such powder. Moreover, it is advisable to use an alkaline suspension in order to ensure a satisfactory polishing efficiency and prevent corrosion.

The composite substrate of this invention may further include a film 3 of a soft magnetic material formed on the insulating oxide film 2. The film 3 has improved magnetic properties, since the oxide film 2 has a smooth and stress-free surface having a surface roughness not greater than 50 Å as hereinbefore set forth, and therefore, protects the film 3 from any adverse effect caused by any unevenness and stress in the substrate 1.

The invention will now be described in further detail with reference to several examples.

EXAMPLE 1

An insulating film of $Al_2O_3$ having a thickness of 15 microns was formed on a carefully polished substrate of $Al_2O_3$-TiC having a diameter of 50 mm and a thickness of 4 mm. The oxide film showed a surface roughness of 200 Å when it was measured by a stylus having a radius of 2.5 microns. The oxide film was polished under a pressure of 0.5 kg/cm$^2$ by a hard cloth polisher rotating at a speed of 40 rpm in a polishing suspension containing in pure water 5% by weight of MgO powder having a particle diameter of 100 Å. As a result, there was obtained a composite substrate carrying an insulating oxide film defining a very smooth and stress-free surface having a surface roughness not greater than 50 Å. It was quite satisfactory in workability.

COMPARATIVE EXAMPLE 1

The procedures of EXAMPLE 1 were repeated for preparing a composite substrate carrying an insulating film of $Al_2O_3$ on a substrate of $Al_2O_3$-TiC. The oxide film was polished by an Sn disk polisher in a suspension of diamond powder having a particle diameter of 2 microns. The oxide film showed a surface roughness of 200 Å when it was measured by a stylus having a radius of 2.5 microns.

COMPARATIVE EXAMPLE 2

The procedures of EXAMPLE 1 were repeated for preparing a composite substrate carrying an insulating film of $Al_2O_3$ on a substrate of $Al_2O_3$-TiC. No polishing was performed on the oxide film.

A Permally film having a thickness of 2.4 microns was formed on the insulating film of each of the composite substrates according to EXAMPLE 1 of this invention and COMPARATIVE EXAMPLES 1 and 2. The Permally film formed on each such composite substrate was tested for a relationship between frequency and permeability (relative value). The results are shown in FIG. 2 in which curve A corresponds to EXAMPLE 1, and curves B and C to COMPARATIVE EXAMPLES 1 and 2, respectively. As is obvious from FIG. 2, the Permally film on the composite substrate of this invention (EXAMPLE 1; curve A) shows a permeability which is about twice higher than that of COMPARATIVE EXAMPLE 1 (curve B) or 2 (curve C) in a high-frequency range (5 MHz) in which a thin-film magnetic head is usually used.

As is obvious from the foregoing description, this invention enables the formation of an insulating oxide film defining a precisely polished, stress-free surface having a surface roughness not greater than 50 Å, and therefore, a film of a magnetic material thereon having improved magnetic properties over those of a magnetic film formed on a mechanically polished surface of a conventional composite substrate.

What is claimed is:

1. A composite substrate for a thin-film magnetic head comprising a substrate made of a material selected from the group consisting of soft magnetic and non-magnetic materials and an insulating film on said substrate, said insulating film having a surface opposite to said substrate which has a surface roughness not greater than 50 Å and is stress-free, said composite substrate being made by (1) providing a substrate made of a material selected from the group consisting of soft magnetic and non-magnetic materials, (2) forming an insulating film on said substrate, said insulating film having a surface opposite to said substrate, (3) placing said substrate with insulating film therein in an aqueous suspension containing between 0.5 and 20% by weight of one or more polishing powders selected from the group consisting of MgO, $SiO_2$ and $Al_2O_3$, each polishing powder having a particle diameter of not greater than 0.1 micron, and (4) polishing the insulating film on said substrate using a rotating polisher to provide a surface roughness to said insulating film of not greater than 50 Å and a stress-free character and thus form said composite substrate.

2. A composite substrate as set forth in claim 1, further including a film of a magnetic material formed on said surface of said insulating film.

3. A composite substrate as set forth in claim 1, wherein said substrate is made of a soft magnetic material selected from the group consisting of Mn-Zn ferrite, Ni-Zn ferrite and Sendust.

4. A composite substrate as set forth in claim 1, wherein said substrate is made of a non-magnetic material of high wear resistance and precision workability selected from the group consisting of $Al_2O_3$-TiC, $Al_2O_3$-$TiO_2$ and $Al_2O_3$-$Fe_2O_3$ ceramics.

5. A composite substrate as set forth in claim 1, wherein said insulating film comprises a non-conductive material of high mechanical strength and hardness selected from the group consisting of $Al_2O_3$ and $SiO_2$.

* * * * *